US010631299B2

(12) United States Patent
Chen et al.

(10) Patent No.: US 10,631,299 B2
(45) Date of Patent: Apr. 21, 2020

(54) TRANSMISSION SCHEME MANAGEMENT FOR COMMON CHANNELS IN NR

(71) Applicant: QUALCOMM Incorporated, San Diego, CA (US)

(72) Inventors: Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/440,553

(22) Filed: Feb. 23, 2017

(65) Prior Publication Data

US 2018/0070343 A1    Mar. 8, 2018

Related U.S. Application Data

(60) Provisional application No. 62/385,040, filed on Sep. 8, 2016.

(51) Int. Cl.
*H04W 72/04* (2009.01)
*H04L 7/04* (2006.01)
*H04W 56/00* (2009.01)
*H04W 48/16* (2009.01)

(52) U.S. Cl.
CPC ............ *H04W 72/046* (2013.01); *H04L 7/04* (2013.01); *H04W 48/16* (2013.01); *H04W 56/00* (2013.01); *H04W 72/042* (2013.01)

(58) Field of Classification Search
CPC . H04W 72/046; H04W 72/042; H04W 56/00; H04W 48/16; H04W 68/02; H04W 72/0446; H04W 88/02; H04L 7/04; H04L 5/0048; H04B 7/0617; H04B 7/0639
See application file for complete search history.

(56) References Cited

U.S. PATENT DOCUMENTS

| 9,380,582 | B2 | 6/2016 | Li et al. |
| 9,413,445 | B2 | 8/2016 | Kim et al. |
| 2011/0065448 | A1* | 3/2011 | Song ............... H04B 7/0632 455/452.2 |

(Continued)

FOREIGN PATENT DOCUMENTS

| EP | 3101942 A1 | 12/2016 |
| WO | WO-2015115376 A1 | 8/2015 |

OTHER PUBLICATIONS

International Search Report and Written Opinion—PCT/US2017/048020—ISA/EPO—dated Oct. 30, 2017.

*Primary Examiner* — Jung Liu
(74) *Attorney, Agent, or Firm* — Patterson & Sheridan, L.L.P.

(57) ABSTRACT

Aspects of the present disclosure relate to wireless communications and, more particularly, to transmission scheme management for common channels in new radio (NR). A method for wireless communications that may be performed by a user equipment (UE) is provided. The method generally includes receiving an indication from a base station (BS) of a type of beam management scheme used by the BS for at least one of: a current transmission or one or more subsequent transmissions; and decoding the at least one of: the current transmission or the one or more subsequent transmissions from the BS in accordance with the indication.

21 Claims, 13 Drawing Sheets

(56) References Cited

U.S. PATENT DOCUMENTS

| | | | |
|---|---|---|---|
| 2013/0286960 A1* | 10/2013 | Li | H04W 72/042 |
| | | | 370/329 |
| 2014/0321375 A1 | 10/2014 | Agiwal et al. | |
| 2015/0004918 A1 | 1/2015 | Wang et al. | |
| 2015/0382334 A1 | 12/2015 | El et al. | |
| 2016/0044517 A1 | 2/2016 | Raghavan et al. | |
| 2017/0244460 A1* | 8/2017 | Li | H04B 7/0619 |
| 2017/0251460 A1* | 8/2017 | Agiwal | H04W 72/0406 |
| 2017/0325260 A1* | 11/2017 | Guo | H04L 5/0007 |
| 2017/0332359 A1* | 11/2017 | Tsai | H04B 7/0617 |
| 2017/0359791 A1* | 12/2017 | Onggosanusi | H04L 5/0023 |

* cited by examiner

TRANSMISSION SCHEME MANAGEMENT FOR COMMON CHANNELS IN NR

CROSS-REFERENCE TO RELATED APPLICATION & PRIORITY CLAIM

This application claims benefit of and priority to U.S. Provisional Patent Application Ser. No. 62/385,040, filed Sep. 8, 2016, which is herein incorporated by reference in its entirety for all applicable purposes.

FIELD OF THE DISCLOSURE

Aspects of the present disclosure generally relate to wireless communication and, more particularly, to transmission scheme management for common channels in new radio (NR).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In a LTE or LTE-Advanced (LTE-A) network, a set of one or more BSs may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., referred to as a new radio BS (NR BS), a NR NB, a network node, a 5G NB, a gNB, an access point AP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR is an example of an emerging telecommunication standard (e.g., 5G radio access). NR is a set of enhancements to the LTE mobile standard promulgated by Third Generation Partnership Project (3GPP). NR is designed to: better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to transmission scheme management for common channels in new radio (NR).

Certain aspects of the present disclosure provide a method that may be performed, for example, by a base station (BS). The method generally includes signaling an indication to a user equipment (UE) of a type of beam management scheme used by the BS for at least one of: a current transmission or one or more subsequent transmissions and sending the at least one of: the current transmission or the one or more subsequent transmissions to the UE in accordance with the indication.

Certain aspects of the present disclosure provide a method that may be performed, for example, by a UE. The method generally includes receiving an indication from a BS of a type of beam management scheme used by the BS for at least one of: a current transmission or one or more subsequent transmissions and decoding the at least one of: the current transmission or the one or more subsequent transmissions from the BS in accordance with the indication.

Certain aspects of the present disclosure provide an apparatus, for example, a BS. The apparatus generally includes means for signaling an indication to a UE of a type of beam management scheme used by the BS for at least one of: a current transmission or one or more subsequent transmissions and means for sending the at least one of: the current transmission or the one or more subsequent transmissions to the UE in accordance with the indication.

Certain aspects of the present disclosure provide an apparatus, for example, a UE. The apparatus generally includes means for receiving an indication from a BS of a type of beam management scheme used by the BS for at least one of: a current transmission or one or more subsequent transmissions and means for decoding the at least one of: the current transmission or the one or more subsequent transmissions from the BS in accordance with the indication.

Certain aspects of the present disclosure provide an apparatus, for example, a BS. The apparatus generally includes a transmitter configured to: signal an indication to a UE of a type of beam management scheme used by the BS for at least one of: a current transmission or one or more subsequent transmissions and send the at least one of: the current transmission or the one or more subsequent transmissions to the UE in accordance with the indication.

Certain aspects of the present disclosure provide an apparatus, for example, a UE. The apparatus generally includes a receiver configured to receive an indication from a BS of a type of beam management scheme used by the BS for at least one of: a current transmission or one or more subsequent transmissions; at least one processor configured to decode the at least one of: the current transmission or the one or more subsequent transmissions from the BS in accordance with the indication; and a memory coupled with the at least one processor.

Certain aspects of the present disclosure provide a computer readable medium having computer executable code stored thereon. The computer executable code generally includes code for signaling an indication to a UE of a type of beam management scheme used by the BS for at least one of: a current transmission or one or more subsequent transmissions and code for sending the at least one of: the current transmission or the one or more subsequent transmissions to the UE in accordance with the indication.

Certain aspects of the present disclosure provide a computer readable medium having computer executable code stored thereon. The computer executable code generally includes code for receiving an indication from a BS of a type of beam management scheme used by the BS for at least one of: a current transmission or one or more subsequent transmissions and code for decoding the at least one of: the current transmission or the one or more subsequent transmissions from the BS in accordance with the indication.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
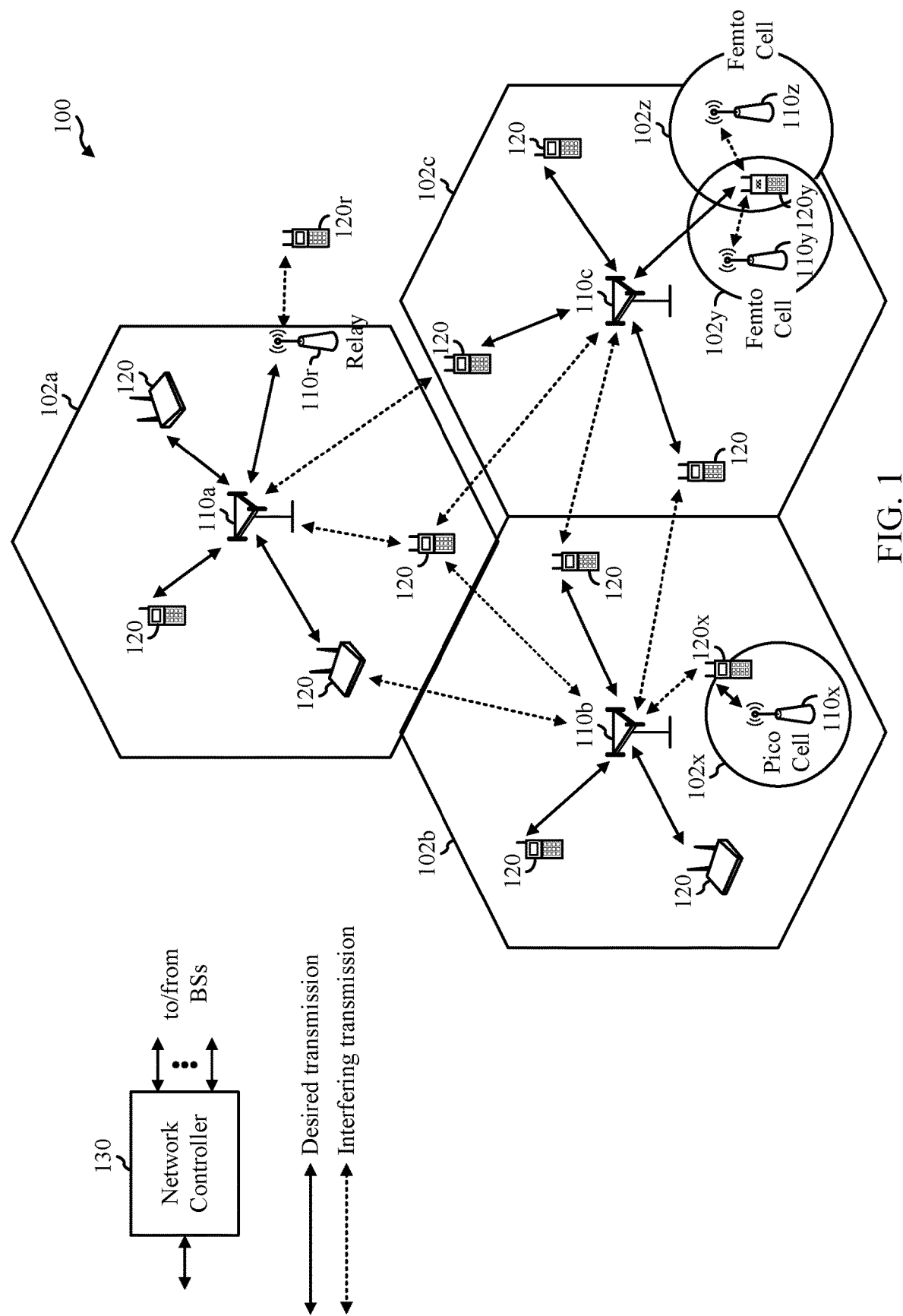
FIG. 1 illustrates an example of a wireless communication network, in accordance with certain aspects of the present disclosure.

Aspects of the present disclosure provide apparatus, methods, processing systems, and computer program products for new radio (NR) (e.g., new radio access technology or 5G technology).

As described herein, in NR, a large number of antennas may be equipped at the base station (BS) (e.g., Node B (NB), evolved NB (eNB), 5G NB, gNB, access point (AP), smart radio head (SRH), transmit receive point (TRP), NR BS, etc.) and/or user equipment (UE) sides. As a result, downlink and uplink transmissions using beam forming may be supported. In some cases, beam sweeping may be used for some common channels to improve coverage, while in other cases beam repetition may be used for these common channels. Accordingly, it may be desirable for the UE to know whether beam sweeping or beam repetition is used. It may also be desirable for the UE to obtain symbol index information.

Aspects described herein provide methods and apparatus for the BS to send a system operation mode indication (e.g., an indication of whether beam sweeping or beam repetition mode is used), a new beam indicator (NBI) (e.g., to indicate that a different beam is being used for the current transmission than the beam used for a previous transmission), and/or a symbol location indicator (e.g., symbol index information), which the UE can use for channel acquisition, channel estimation, combining, and/or determining symbol index location.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as NR (e.g., 5G radio access) global system for mobile communications (GSM). An OFDMA network may implement a radio technology such as evolved UTRA (E-UTRA), ultra mobile broadband (UMB), IEEE 802.11 (WiFi), IEEE 802.16 (WiMAX), IEEE 802.20, Flash-OFDM®, etc. UTRA and EUTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use EUTRA, which employs OFDMA on the downlink and SC-FDMA on the uplink. UTRA, EUTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communication technology under development in conjunction with the 5G Technology Forum (5GTF). The techniques described herein may be used for the wireless networks and radio technologies mentioned above as well as other wireless networks and radio technologies. LTE and LTE-A are referred to generally as LTE. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications Network

FIG. 1 illustrates an example wireless communication network 100 in which aspects of the present disclosure may be performed. For example, wireless communication network 100 may be a new radio (NR) or 5G network. As illustrated in FIG. 1, wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NB and/or a NB subsystem serving this coverage area, depending on the context in which the term is used. In NR systems, the term "cell" and gNB, NB, evolved NB (eNB), 5G NB, access point (AP), NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network. UEs 120 may dispersed in wireless communication network 100.

In an example, BS 110 may signal an indication (e.g., of a transmission scheme) to UE 120 of whether at least one of a current transmission (e.g., of a common channel) and one or more subsequent transmissions will be sent using a repeated beam as a previous transmission (e.g., according to beam repetition mode of operation) or a different beam (e.g., according to a beam sweeping mode of operation). BS 110 may send the current transmission and/or one or more subsequent transmissions to the UE 120 in accordance with the indication. BS 110 may signal symbol index information for at least one subframe to UE 120 and transmit one or more synchronization signals to UE 120 in the at least subframe using beam sweeping. UE 120 may decode the current transmission and/or one or more subsequent transmission from BS 110 in accordance with the received indication and/or symbol index information.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, BSs 110$a$, 110$b$ and 110$c$ may be macro BSs for macro cells 102$a$, 102$b$ and 102$c$, respectively. BS 110$x$ may be a pico BS for pico cell 102$x$. BSs 110$y$ and 110$z$ may be femto BSs for femto cells 102$y$ and 102$z$, respectively. A BS may support one or multiple (e.g., three) cells.

Wireless communication network 100 may also include relay stations. A relay station is a station that receives a transmission of data and/or other information from an upstream station (e.g., a BS 110 or a UE 120) and sends a transmission of the data and/or other information to a downstream station (e.g., a UE 120 or a BS 110). A relay station may also be a UE that relays transmissions for other UEs. In the example shown in FIG. 1, relay station 110$r$ may communicate with BS 110$a$ and a UE 120$r$ in order to facilitate communication between BS 110$a$ and UE 120$r$. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in wireless communication network 100. For example, a macro BS may have a high transmit power level (e.g., 20 Watts), whereas pico BS, femto BS, and relays may have a lower transmit power level (e.g., 1 Watt).

Wireless communication network 100 may support synchronous or asynchronous operation. For synchronous operation, BSs 110 may have similar frame timing, and transmissions from different BSs may be approximately aligned in time. For asynchronous operation, BSs 110 may have different frame timing, and transmissions from different BSs may not be aligned in time. The techniques described herein may be used for both synchronous and asynchronous operation.

Network controller 130 may couple to a set of BSs and provide coordination and control for these BSs. Network controller 130 may communicate with BSs 110 via a backhaul. BSs 110 may also communicate with one another, e.g., directly or indirectly via wireless or wireline backhaul.

UEs 120 (e.g., 120$x$, 120$y$, etc.) may be dispersed throughout wireless communication network 100, and each UE 120 may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a resource block (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex (HD) operation using time divisional duplexing (TDD). A single component carrier bandwidth of 100 MHz may be supported. NR RBs may span 12 subcarriers with a subcarrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such as CUs and/or DUs.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover.

Figure 2:
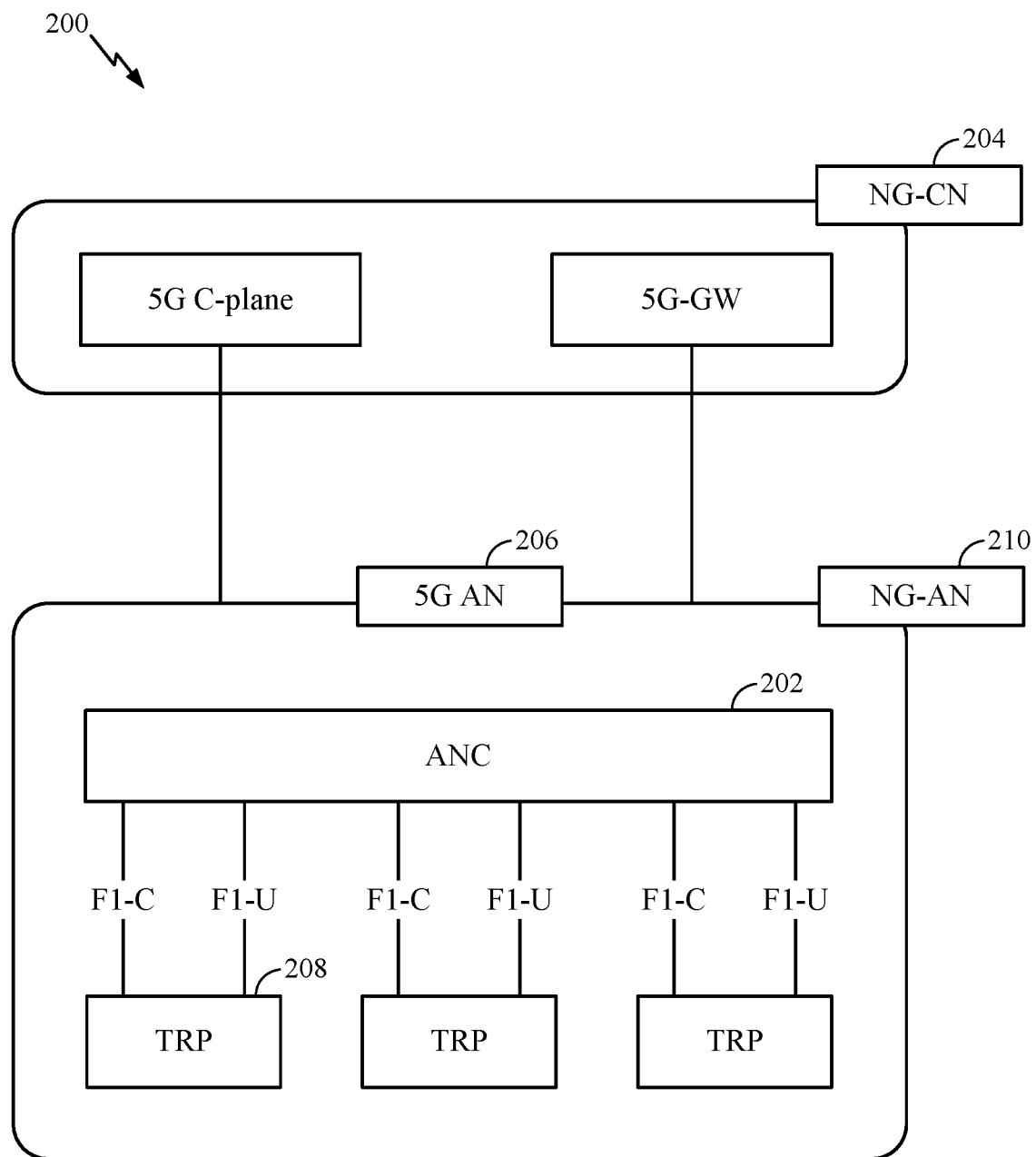
FIG. 2 shows a block diagram illustrating an example logical architecture of a distributed radio access network (RAN), in accordance with certain aspects of the present disclosure.

FIG. 2 illustrates an example logical architecture 200 of a distributed RAN, which may be implemented in the wireless communication system illustrated in FIG. 1. 5G access node (AN) 206 may include access node controller (ANC) 202. ANC 202 may be a CU of the distributed RAN 200. The backhaul interface to the next generation core network (NG-CN) 204 may terminate at ANC 202. The backhaul interface to neighboring next generation access nodes (NG-ANs) 210 may terminate at ANC 202. ANC 202 may include one or more TRPs 208 (which may also be referred to as BSs, NR BSs, NBs, 5G NBs, eNBs, APs, gNBs, or some other term).

TRPs 208 may comprise a DU. TRPs 208 may be connected to one ANC (e.g., ANC 202) or more than one ANC (not illustrated). For example, for RAN sharing, radio as a service (RaaS), and service specific AND deployments, TRP 208 may be connected to more than one ANC. A TRP may include one or more antenna ports. TRPs 208 may be configured to individually (e.g., dynamic selection) or jointly (e.g., joint transmission) serve traffic to a UE.

Logical architecture 200 may be used to illustrate fronthaul definition. Logical architecture 200 may support fronthauling solutions across different deployment types. For example, logical architecture 200 may be based on transmit network capabilities (e.g., bandwidth, latency, and/or jitter). Logical architecture 200 may share features and/or components with LTE. NG-AN 210 may support dual connectivity with NR. NG-AN 210 may share a common fronthaul for LTE and NR. Logical architecture 200 may enable cooperation between and among TRPs 208. For example, cooperation may be preset within a TRP and/or across TRPs via ANC 202. In some cases, no inter-TRP interface may be needed/present.

A dynamic configuration of split logical functions may be present within logical architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and Physical (PHY) layers may be adaptably placed at the DU or CU (e.g., TRP 208 or ANC 202, respectively). A BS may include a CU (e.g., ANC 202) and/or one or more DUs (e.g., one or more TRPs 208).

Figure 3:
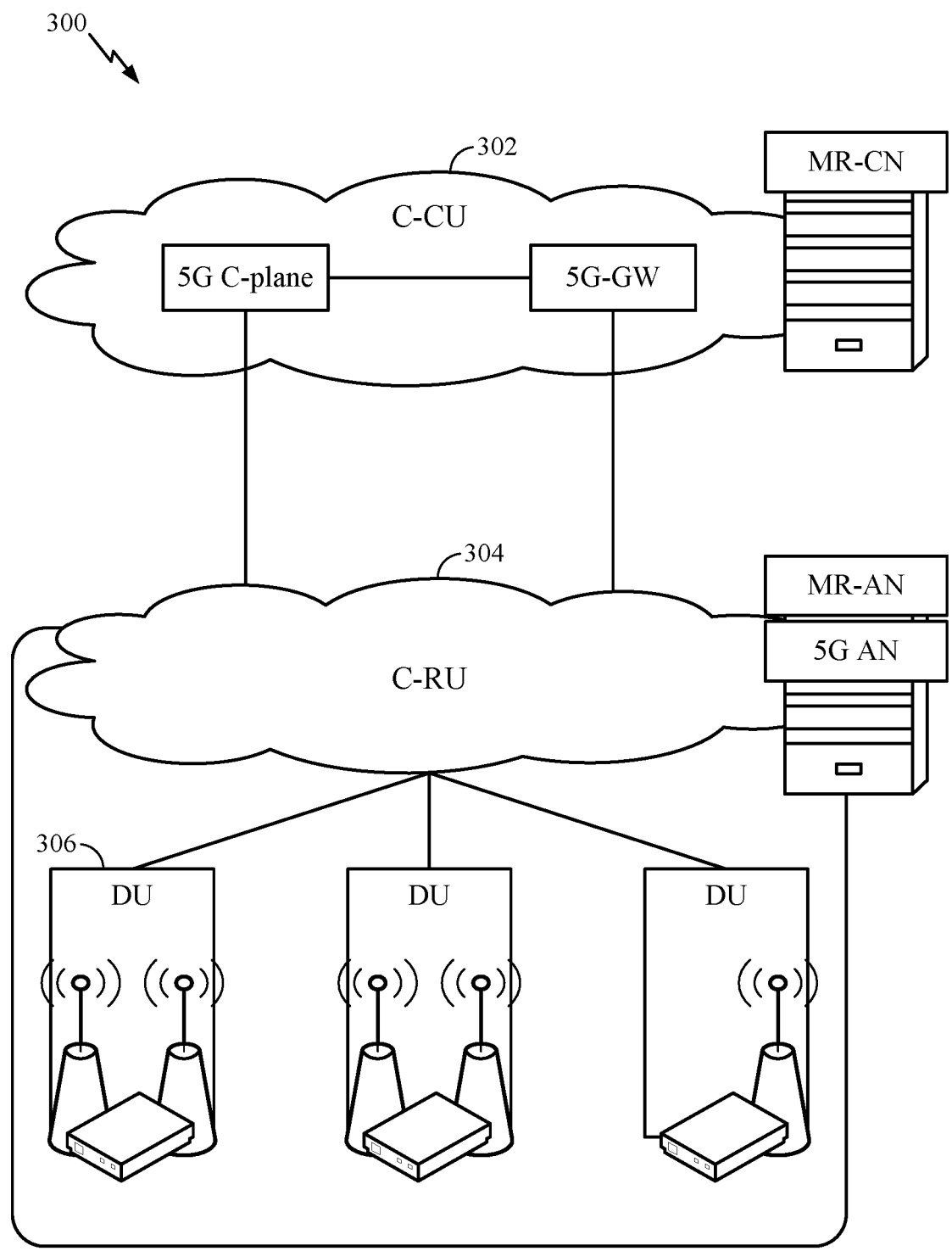
FIG. 3 is a block diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

Centralized RAN unit (C-RU) 304 may host one or more ANC functions. Optionally, C-RU 304 may host core network functions locally. C-RU 304 may have distributed deployment. C-RU 304 may be closer to the network edge.

DU 306 may host one or more TRPs (e.g., edge node (EN), an edge unit (EU), a radio head (RH), a smart radio head (SRH), or the like). DU 306 may be located at edges of the network with radio frequency (RF) functionality.

Figure 4:
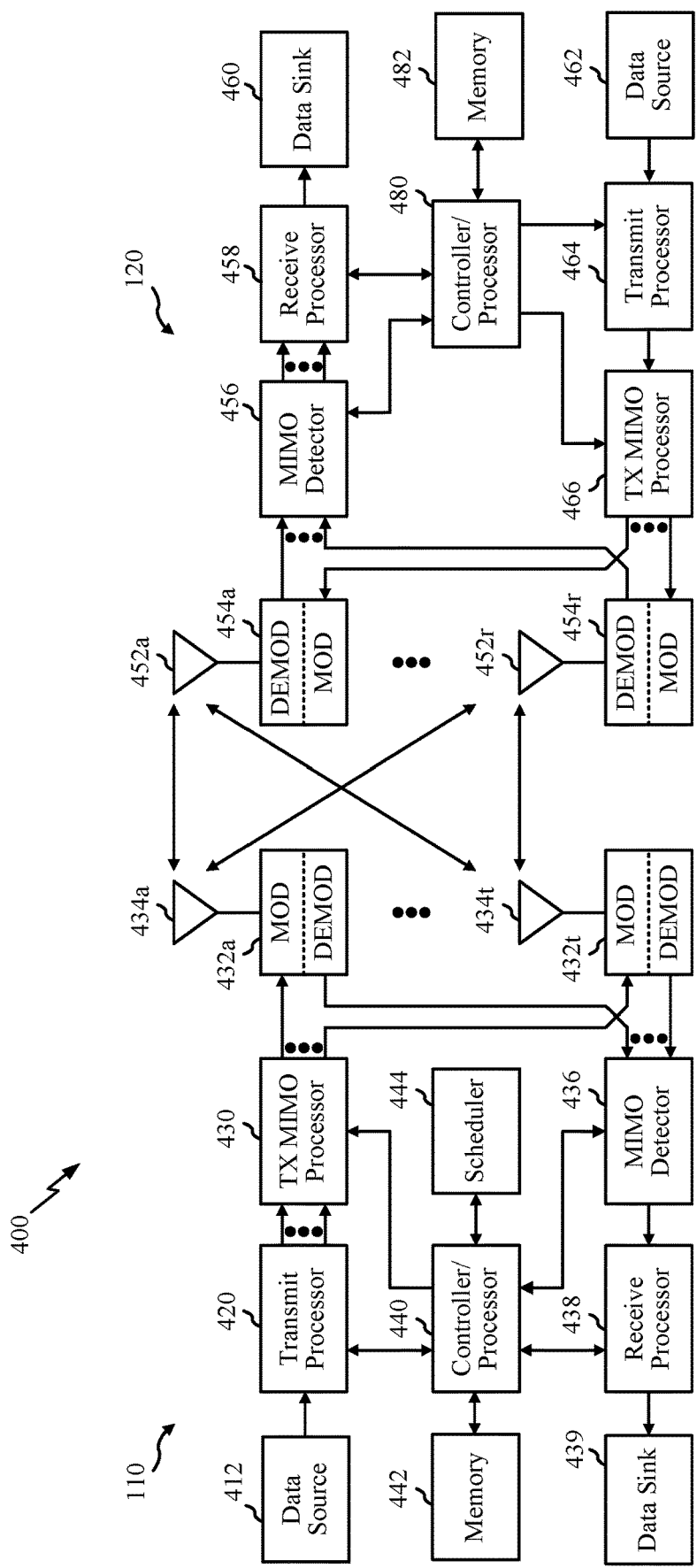
FIG. 4 is a block diagram conceptually illustrating a design of an example base station (BS) and user equipment (UE), in accordance with certain aspects of the present disclosure.

FIG. 4 illustrates example components of BS 110 and UE 120 illustrated in FIG. 1, which may be used to implement aspects of the present disclosure. One or more components of BS 110 and UE 120 may be used to practice aspects of the present disclosure. For example, antennas 452, Tx/Rx 222, processors 466, 458, 464, and/or controller/processor 480 of UE 120 and/or antennas 434, processors 460, 420, 438, and/or controller/processor 440 of BS 110 may be used to perform operations 900 described herein and illustrated with reference to FIG. 9, respectively.

FIG. 4 shows a block diagram of a design of BS 110 and UE 120, which may be one of the BSs and one of the UEs in FIG. 1. For a restricted association scenario, BS 110 may be macro BS 110c in FIG. 1, and UE 120 may be UE 120y. BS 110 may also be a BS of some other type. BS 110 may be equipped with antennas 434a through 434t, and UE 120 may be equipped with antennas 452a through 452r.

At BS 110, transmit processor 420 may receive data from data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. Processor 420 may process (e.g., encode and symbol map) the data and control information to obtain data symbols and control symbols, respectively. Processor 420 may also generate reference symbols, e.g., for the PSS, SSS, and cell-specific reference signal. Transmit (TX) multiple-input multiple-output (MIMO) processor 430 may perform spatial processing (e.g., precoding) on the data symbols, the control symbols, and/or the reference symbols, if applicable, and may provide output symbol streams to modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At UE 120, antennas 452a through 452r may receive the downlink signals from BS 110 and may provide received signals to demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. MIMO detector 456 may obtain received symbols from all the demodulators 454a through 454r, perform MIMO detection on the received symbols if applicable, and provide detected symbols. Receive processor 458 may process (e.g., demodulate, deinterleave, and decode) the detected symbols, provide decoded data for UE 120 to data sink 460, and provide decoded control information to controller/processor 480.

On the uplink, at UE 120, transmit processor 464 may receive and process data (e.g., for the Physical Uplink Shared Channel (PUSCH)) from data source 462 and control information (e.g., for the Physical Uplink Control Channel (PUCCH)) from controller/processor 480. Transmit processor 464 may also generate reference symbols for a reference signal (RS). The symbols from transmit processor 464 may be precoded by TX MIMO processor 466 if applicable, further processed by demodulators 454a through 454r (e.g., for SC-FDM, etc.), and transmitted to BS 110. At BS 110, the uplink signals from UE 120 may be received by antennas 434, processed by modulators 432, detected by MIMO detector 436 if applicable, and further processed by receive processor 438 to obtain decoded data and control information sent by UE 120. Receive processor 438 may provide the decoded data to data sink 439 and the decoded control information to controller/processor 440.

Controllers/processors 440 and 480 may direct the operation at BS 110 and UE 120, respectively. Processor 440 and/or other processors and modules at BS 110 may perform or direct, e.g., the execution of various processes for operations 900 and the other techniques described herein. Processor 480 and/or other processors and modules at UE 120 may perform or direct, e.g., the execution of various processes for operations 1000 and the other techniques described herein. Memories 442 and 482 may store data and program codes for BS 110 and UE 120, respectively. Scheduler 444 may schedule UEs for data transmission on the downlink and/or uplink.

Figure 5:
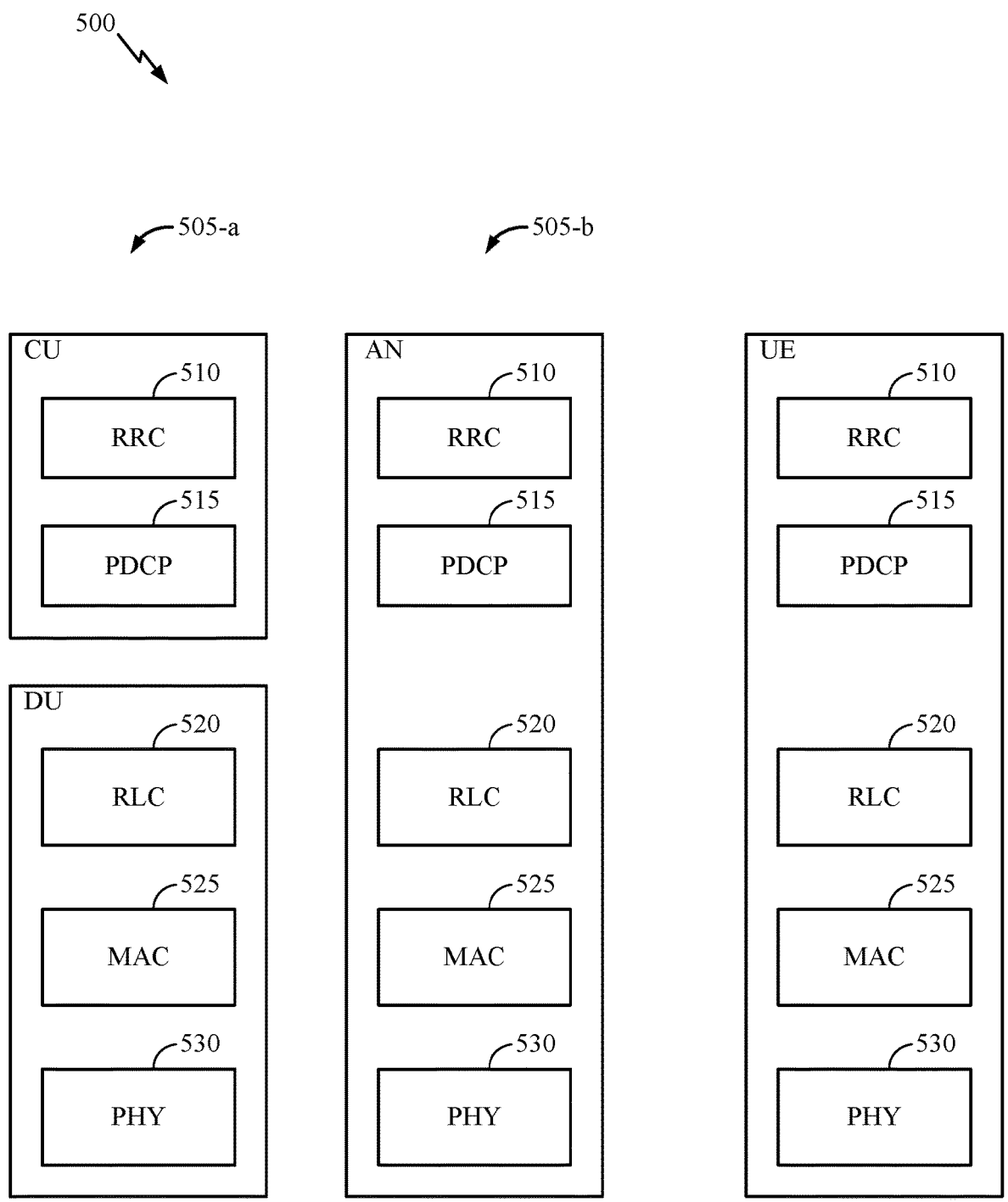
FIG. 5 is a diagram illustrating example implementation of a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including RRC layer 510, PDCP layer 515, RLC layer 520, MAC layer 525, and PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

The example implementation of protocol stack 505-a shows a split implementation of the protocol stack, in which implementation of the protocol stack is split between a centralized network access device (e.g., a CU such as an ANC 202 in FIG. 2) and distributed network access device (e.g., DU 208 in FIG. 2). In the implementation of protocol stack 505-a, RRC layer 510 and PDCP layer 515 are implemented by the CU, and RLC layer 520, MAC layer 525, and PHY layer 530 are implemented by the DU. In various examples the CU and the DU may be collocated or non-collocated. The implementation of the protocol stack 505-a may be useful in a macro cell, micro cell, or pico cell deployment.

Another example implementation of protocol stack 505-b shows a unified implementation of a protocol stack, in which the protocol stack is implemented in a single network access device (e.g., AN, such as BS, a network node (NN), or the like.). In the example implementation of protocol stack 505-b, RRC layer 510, PDCP layer 515, RLC layer 520, MAC layer 525, and PHY layer 530 may each be implemented by the AN. The example implementation of a protocol stack 505-b may be useful in a femto cell deployment.

Regardless of whether a network access device implements part or all of a protocol stack, a UE may implement an entire protocol stack (e.g., RRC layer 510, PDCP layer 515, RLC layer 520, MAC layer 525, and PHY layer 530), as shown in FIG. 5.

Figure 6:
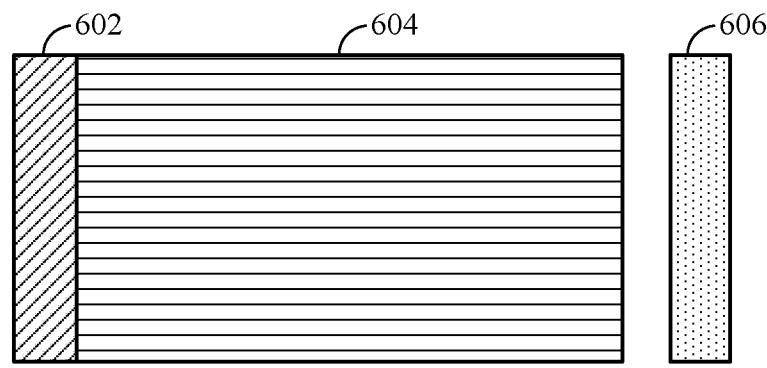
FIG. 6 is a diagram illustrating an example of a downlink (DL)-centric subframe, in accordance with certain aspects of the present disclosure.

FIG. 6 is a diagram showing an example of a DL-centric subframe 600. DLcentric subframe 600 may include control portion 602. Control portion 602 may exist in the initial or beginning portion of DL-centric subframe 600. Control portion 602 may include various scheduling information and/or control information corresponding to various portions of DL-centric subframe 600. In some configurations, control portion 602 may be a physical DL control channel (PDCCH), as shown in FIG. 6. DL-centric subframe 600 may also include a DL data portion 604. DL data portion 604 may sometimes be referred to as the payload of DL-centric subframe 600. DL data portion 604 may include the communication resources utilized to communicate DL data from the scheduling entity (e.g., a UE or a BS) to the subordinate entity (e.g., a UE). In some cases, DL data portion 604 may be a physical DL shared channel (PDSCH).

DL-centric subframe 600 may also include a common UL portion 606. The common UL portion 606 may sometimes be referred to as an UL burst, a common UL burst, and/or various other suitable terms. Common UL portion 606 may include feedback information corresponding to various other portions of DL-centric subframe 600. For example, common UL portion 606 may include feedback information corresponding to control portion 602. Non-limiting examples of feedback information may include an ACK signal, a NACK signal, a HARQ indicator, and/or various other suitable types of information. Common UL portion 606 may include additional or alternative information, such as information pertaining to random access channel (RACH) procedures, scheduling requests (SRs), and various other suitable types of information. As illustrated in FIG. 6, the end of DL data portion 604 may be separated in time from the beginning of common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
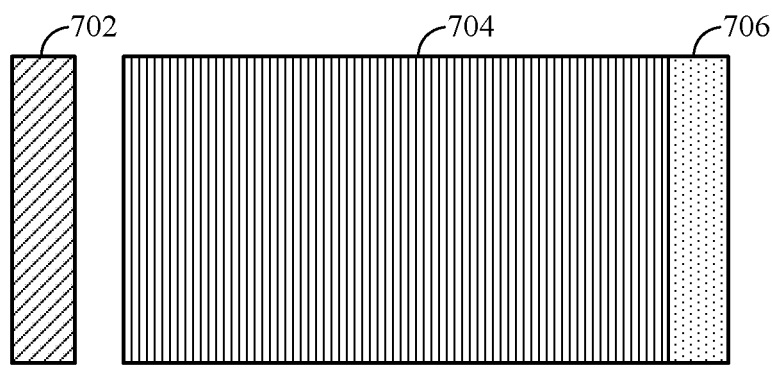
FIG. 7 is a diagram illustrating an example of an uplink (UL)-centric subframe, in accordance with certain aspects of the present disclosure.

FIG. 7 is a diagram showing an example of an UL-centric subframe 700. UL-centric subframe 700 may include control portion 702. Control portion 702 may exist in the initial or beginning portion of UL-centric subframe 700. Control portion 702 in FIG. 7 may be similar to the control portion described above with reference to FIG. 6. UL-centric subframe 700 may also include UL data portion 704. UL data portion 704 may sometimes be referred to as the payload of UL-centric subframe 700. UL portion may refer to the communication resources utilized to communicate UL data from the subordinate entity (e.g., UE) to the scheduling entity (e.g., a UE or a BS). In some cases, control portion 702 may be a physical DL control channel (PDCCH).

As illustrated in FIG. 7, the end of control portion 702 may be separated in time from the beginning of UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). UL-centric subframe 700 may also include common UL portion 706. Common UL portion 706 in FIG. 7 may be similar to common UL portion 706 described above with reference to FIG. 7. Common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., a UE or a BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 8:
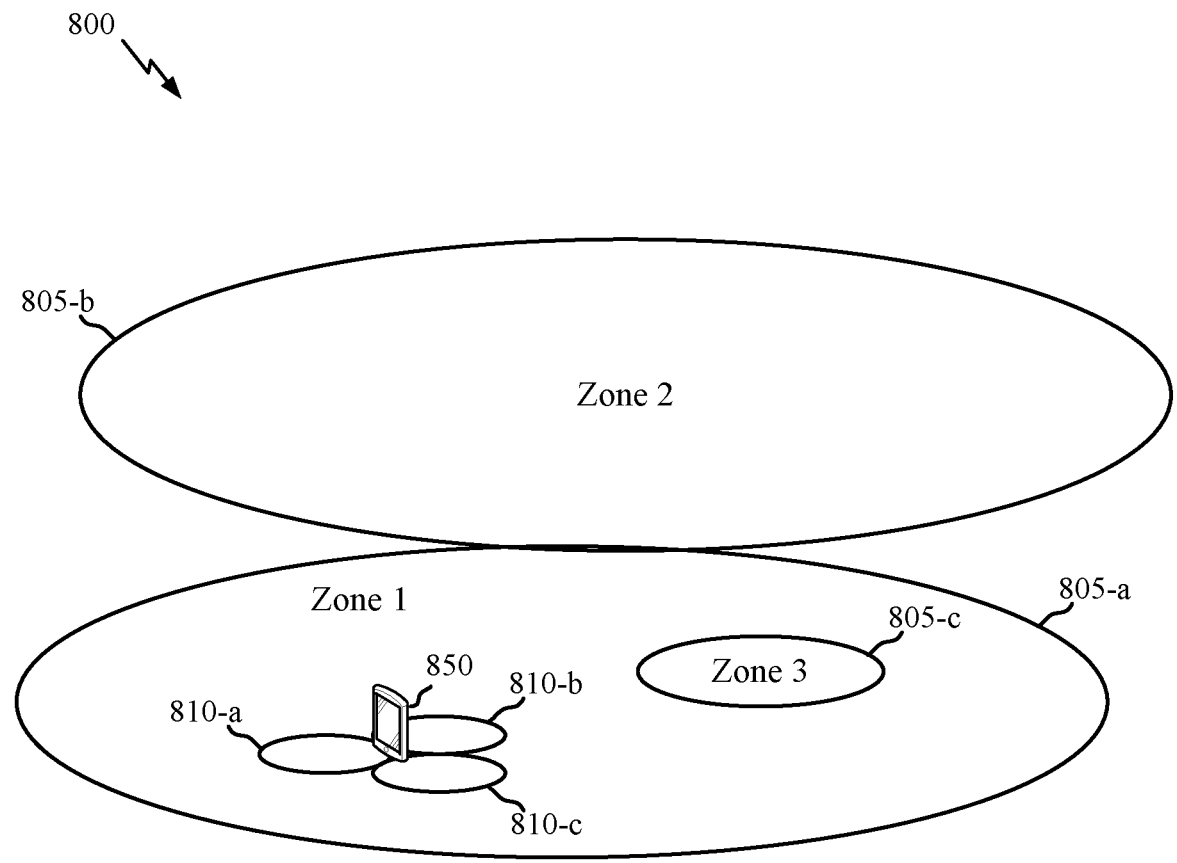
FIG. 8 illustrates an example of a wireless communication system supporting zones, in accordance with certain aspects of the present disclosure.

FIG. 8 illustrates an example of a wireless communication system 800 supporting a number of zones, in accordance with aspects of the present disclosure. Wireless communication system 800 may include a number of zones (including, e.g., a first zone 805-$a$ (Zone 1), a second zone 805-$b$ (Zone 2), and a third zone 805-$c$ (Zone 3)). A number of UEs may move within or between the zones.

A zone may include multiple cells, and the cells within a zone may be synchronized (e.g., the cells may share the same timing). Wireless communication system 800 may include examples of both non-overlapping zones (e.g., the first zone 805-$a$ and the second zone 805-$b$) and overlapping zones (e.g., the first zone 805-$a$ and the third zone 805-$c$). In some examples, the first zone 805-$a$ and the second zone 805-$b$ may each include one or more macro cells, micro cells, or pico cells, and the third zone 1105-$c$ may include one or more femto cells.

By way of example, UE 850 is shown to be located in the first zone 805-$a$. If UE 850 is operating with a radio resource configuration associated with transmitting pilot signals using a common set of resources, such as an RRC common state, UE 850 may transmit a pilot signal using a common set of resources. Cells (e.g., ANs, DUs, etc.) within the first zone 805-$a$ may monitor the common set of resources for a pilot signal from UE 850. If UE 850 is operating with a radio resource configuration associated with transmitting pilot signals using a dedicated set of resource, such as an RRC dedicated state, UE 850 may transmit a pilot signal using a dedicated set of resources. Cells of a monitoring set of cells established for UE 850 within the first zone 805-$a$ (e.g., a first cell 810-$a$, a second cell 810-$b$, and a third cell 810-$c$) may monitor the dedicated set of resources for the pilot signal of the UE 850.

Example Transmission Scheme Management for Common Channels in NR

In new radio (NR) (e.g., 5G) systems (e.g., such as wireless communication system 100), a large number of antennas may be equipped at the base station (BS) (e.g., such as a BS 110) and user equipment (UE) (e.g., such as a UE 120) sides. As a result, downlink and uplink transmissions may be sent using beams (e.g., beamformed transmission). In an example, beams may be used high carrier frequencies (e.g., 28 GHz or above). Each beam may be associated with one antenna port of the BS or UE.

Beam-based operation may be used for common procedures (e.g., such as initial access) and UE-specific procedures (e.g., unicast traffic). Some common procedures include primary synchronization signal (PSS), secondary synchronization signal (SSS), and/or physical broadcast channel (PBCH) transmission.

Some beam-based operations are open-loop. For open-loop beam-based operation, the transmitting device, for example the BS, may select the beam for transmission without any feedback from the receiving device (e.g., the UE). Thus, the beams used for the transmission (e.g., uplink or downlink signals/channels) may be transparent to the receiving device and may be subject to change.

Some beam-based operations can be closed-loop (e.g., for UE-specific procedures). For closed-loop beam-based operations, the transmitting device (e.g., a BS) may select the beam based on feedback from the receiving device (e.g., UE-specific feedback). Based on the feedback, the transmitting device can determine a best set of beams for the receiving device (e.g., UE-specific operation) or a group of receiving devices (group-specific operation).

In certain scenarios, a beam sweeping mode of operation may be used, for example, to improve coverage for common signals/channels. However, in other scenarios, a beam repetition mode of operation may be used for these common signals/channels. In the beam sweeping mode of operation, the beams used by the transmitting device for the common signal/channels transmission may be swept in an open-loop manner. Thus, without receiving any indication, the receiving device may not assume a same beam across different transmission instances, since the receiving device does not know whether beam sweeping or beam repetition is being used, and the receiving device does not know what beams are being used for transmissions because the beam sweeping is open-loop.

While beam-sweeping may improve diversity, if a same beam is used for a consecutive number of transmission instances (e.g., in the beam repetition mode operation), channel acquisition may be improved since the receiving device knows the beam and may perform coherent channel estimation and combination over multiple instances using the same beams.

In some cases, a combination of beam-sweeping and beam-repetition may be used. For example, the same beam may be used (e.g., repeated) for two or more transmission instances before changing to a different beam.

Thus, it may be desirable for the receiving device to be aware of when beams will be repeated or swept and/or when a new beam is being used. That way, the benefits of beam diversity may be achieved while also allowing the receiving device to have knowledge of the beams and achieve the benefits for channel acquisition.

Accordingly, aspects of the present disclosure provide techniques for transmission scheme management for common channels in NR. Aspects described herein provide methods and apparatus for the BS to send a system operation mode indicator (e.g., an indication of whether the BS uses a beam sweeping or beam repetition mode of operation), a new beam indicator (NBI) (e.g., an indication of whether the BS is using a same beam or switching to a different beam), and/or a symbol location indicator (e.g., symbol index information), which the UE can use for channel acquisition, channel estimation and combining, decoding, and/or determining symbol index location.

Figure 9:
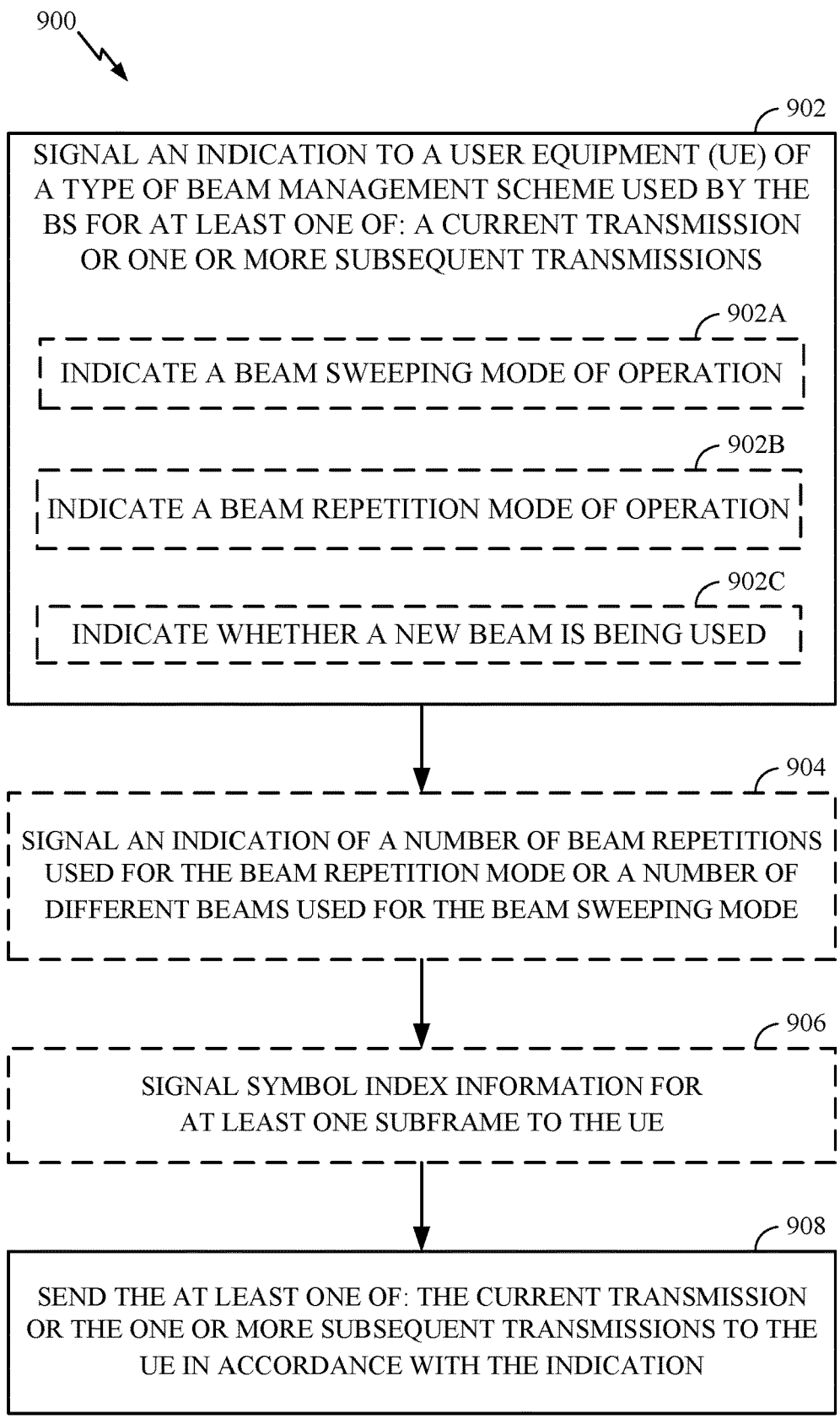
FIG. 9 illustrates example operations for transmission scheme management by a BS, in accordance with certain aspects of the present disclosure.

FIG. 9 is a flow diagram illustrating example operations 900 for transmission scheme management, in accordance with certain aspects of the present disclosure. Operations 900 may be performed, for example, by a BS (e.g., BS 110). As illustrated, operations 900 begin, at 902, by signaling an indication to a UE of a type of beam management scheme used by the BS for at least one of: a current transmission or one or more subsequent transmissions (e.g., PSS, SSS, PBCH, SIB, etc.). As illustrated in FIG. 9, the signaling may indicate a beam sweeping mode of operation at 902A or beam repetition mode of operation at 902B (e.g., using an operation mode indicator). Additionally or alternatively, the signaling may indicate (e.g. periodically or event-driven) whether a new beam is being used at 902C (e.g., using a new beam indicator). According to certain aspects, the indication may be provided with an existing data signal/channel, an existing control signal/channel, or via a separate channel.

As illustrated in FIG. 9, at 904, the BS may also (optionally) signal an indication of a number of repetitions used for the beam repetition mode of operation or a number of different beams used for the beam sweeping mode of operation.

As illustrated in FIG. 9, at 906, the BS may also (optionally) signal symbol index location information for at least subframe to the UE.

At 908, the BS sends the at least one of: the current transmission and the one or more subsequent transmissions to the UE in accordance with the indication. For example, if the indication indicates the beam repetition mode of operation, the BS transmits using a same beam as a previous transmission (e.g., the immediately preceding transmission). If the indication indicates the beam sweeping mode of operation or a new beam indication, the BS transmits using a different beam than the previous transmission. In some cases, transmitting using the beam sweeping mode of operation may include using beam sweeping over N symbols and repeating the beam sweeping every M subframes, wherein N and M are based on at least one of the type of transmission or a frequency of the transmission. In some cases, transmitting using the beam sweeping mode of operation may include sweeping over a range of beams, but repeating each of the beams for a number of symbols or transmissions before switching to the next beam.

Figure 10:
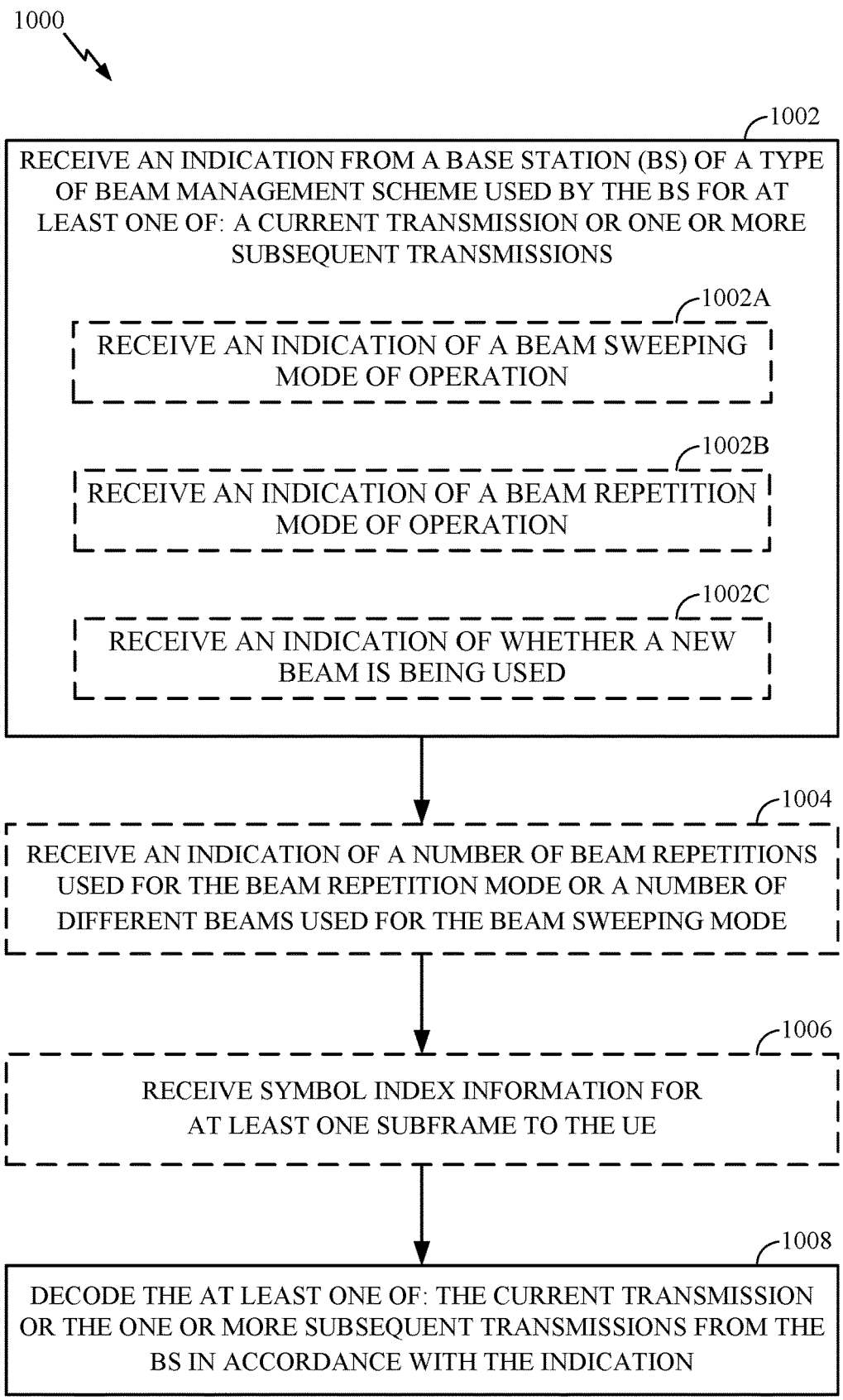
FIG. 10 illustrates example operations performed, by a UE, for decoding signals based on an indication of a transmission scheme, in accordance with certain aspects of the present disclosure.

FIG. 10 is a flow diagram illustrating example operations 1000 for transmission scheme management, in accordance with certain aspects of the present disclosure. Operations 1000 may be performed, for example, by a UE (e.g., UE 120). Operations 1000 may be complementary to the operations 900 performed by the BS illustrated in FIG. 9.

As illustrated in FIG. 10, operations 1000 begin, at 1002, by receiving an indication from a BS of a type of beam management scheme used by the BS for at least one of: a current transmission or one or more subsequent transmissions. The indication may include receiving an indication that the BS uses a beam sweeping mode of operation at 1002A or receiving an indication that the BS uses a beam repetition mode of operation at 1002B (e.g., the UE may receive an operation mode indicator). Additionally or alternatively, the signaling may indicate (e.g. periodically or event-driven) whether a new beam is being used at 1002C (e.g., the UE may receive a new beam indicator). According to certain aspects, the indication may be receive in an existing data signal/channel, an existing control signal/channel, or a separate channel.

As illustrated in FIG. 10, at 1004, the UE may also (optionally) receive an indication of a number of repetitions used for the beam repetition mode of operation or a number of different beams used for the beam sweeping mode of operation.

As illustrated in FIG. 10, at 1006, the UE may also (optionally) signal symbol index location information for at least subframe to the UE.

At 1008, the UE decodes the at least one of: the current transmission or the one or more subsequent transmissions from the BS in accordance with the indication. According to certain aspects, the UE can perform channel detection (acquisition) based the indication of the transmission scheme.

Example System Operation Indicator

According to certain aspects, a system operation indicator may be used for transmission scheme management. The transmitting device (e.g., the BS) may signal an indication (e.g., the system operation indicator) to the receiving device (e.g., the UE) to indicate whether the transmitting device operates in a beam sweeping mode of operation or a beam repetition mode of operation. Thus, the indication may indicate to the receiving device whether the current transmission and/or one or more subsequent transmissions from the transmitting device use a same beam (e.g., beam repetition operation) as a previous transmission or a different beam (e.g., beam sweeping operation) than the previous transmission.

According to certain aspects, the indication (e.g., the system operation indicator) may be used for (e.g., apply to) synchronization signals/channels (e.g., such as PSS/SSS/PBCH), reference signals, and/or broadcast channels (e.g., such as SIBx and its RS). For example, the indication may indicate whether transmissions of those channels/signals will be transmitted using beam repetition or beam sweeping.

The beam sweeping mode of operation may be used to sweep beams for synchronization signals/channels and/or broadcast channels to improve coverage. For example, beam sweeping may sweep over N symbols in a subframe and the beam sweeping may repeat very M ms (e.g., subframes), especially for higher frequencies like 28 GHz or greater. In one example, N=14 (e.g., a different beam is used for each symbol in a subframe) and M=5 (e.g., the beam sweeping is repeated every 5 subframes). Beam repetition may be used, for example, for system that do not support beamforming for synchronization channels (e.g., for carrier frequencies below 6 GHz).

Figure 11:
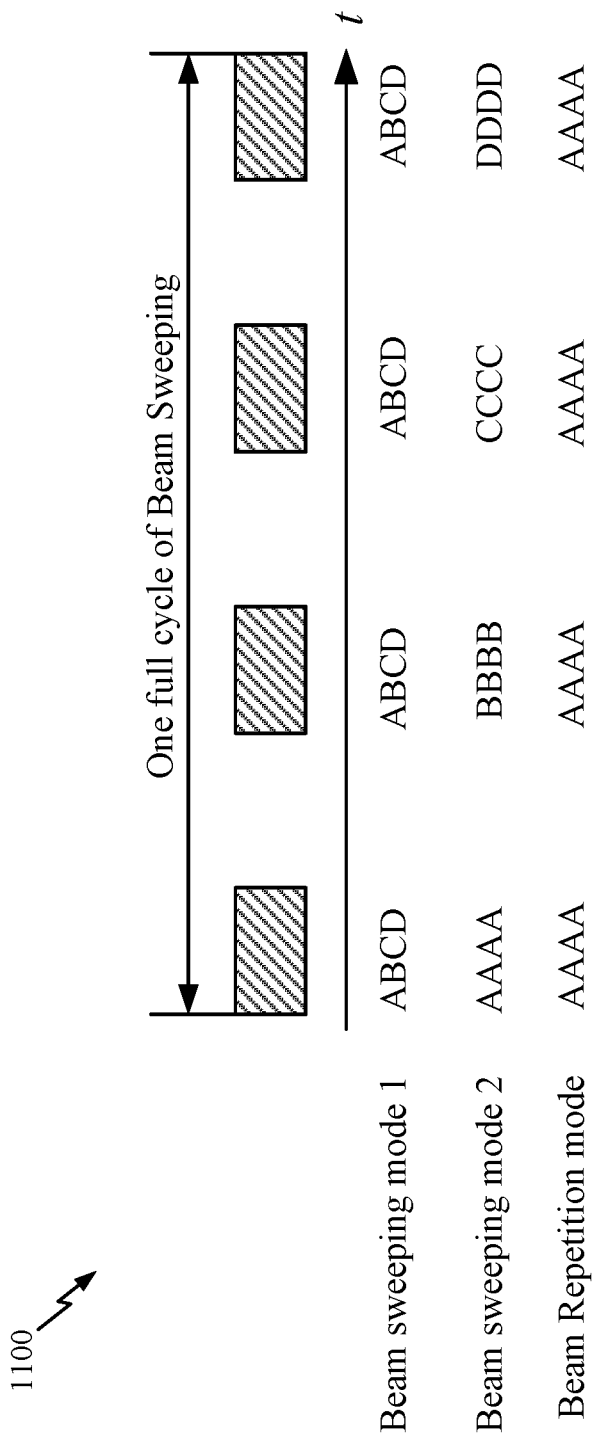
FIG. 11 illustrates example beamed transmissions for beam sweeping and beam repetition operating modes, in accordance with certain aspects of the present disclosure.

FIG. 11 illustrates example a transmission timeline 1100 for beamed transmissions using beam sweeping and beam repetition operating modes, in accordance with certain aspects of the present disclosure. As shown in FIG. 11, in one example beam sweeping mode (beam sweeping mode 1), the transmitting device (e.g., the BS) transmits subsequent transmissions using different beams "ABCD" and repeats the beam sweeping after a duration, where A, B, C, and D are four different beams. The beamwidth of each beam can be one or more symbols long or one or more subframes long. Although four beams (A, B, C, and D) are illustrated in FIG. 11, different numbers of beams may be used for the beam sweeping. Also, while a full cycle of beam sweeping shows four sweeps, different lengths of beam sweeping cycles may be used.

As shown in FIG. 11, in another beam sweeping mode (beam sweeping mode 2), which may be a hybrid beam-sweeping/beam-repetition mode, the transmitting device transmits subsequent transmissions using beam repetition "AAAA", switches (e.g., sweeps) to a new beam "B" after a duration, and repeats the new beam using beam repetition "BBBB", and so on (e.g., "CCCC", and "DDDD"). Thus, in the beam sweeping cycle illustrated in FIG. 11, the transmitting device sweeps over all four of the different beams during the cycle.

In the example beam repetition mode, the BS repeats the same beam though the full cycle. For example, as shown in FIG. 11, the BS transmits "AAAA" throughout the full cycle. Although repetition of A is shown in FIG. 11, the transmitting device could use any of the beams for beam repetition.

Since the beam sweeping mode (e.g., beam sweeping mode 2) may include repetitions before each beam switch, beamforming systems and non-beamforming systems may have a unified design. For example, in these cases, the beam repetition mode may be considered a special case of the beam sweeping mode.

According to certain aspects, for the beam repetition mode of operation (or for the hybrid beam-sweeping/beam-repetition mode of operation) the transmitting device may signal an indication of the number of repetitions. For the beam sweeping mode of operation (or for the hybrid beam-sweeping/beam-repetition mode of operation) the transmitting device may signal an indication of the number of different beams for the beam sweeping.

According to certain aspects, the indication (e.g., the system operation indicator) of the type of beam management scheme being used (e.g., beam repetition, beam sweeping, or hybrid beam-sweeping/beam-repetition) may be provided as a separate indication (e.g., a new dedicated indicator channel) or may be embedded in an existing signal/channel (e.g., PSS, SSS, and/or PBCH). In one example, the indication can be carried via different PSS sequences. In another example, the indication can be carried in the master information block (MIB). This may be useful for improving serving cell tracking and/or neighboring cell measurement.

Example New Beam Indicator

According to certain aspects, a new beam indicator (NBI) may be used for transmission scheme management. The transmitting device (e.g., the BS) can signal an indication (e.g., the NBI) to the receiving device (e.g., the UE) that indicates whether a new beam is being used.

According to certain aspects, the new beam may be used for a symbol, a set of symbols in a subframe, or for a set of subframes before switching to a different beam (e.g., and sending another NBI to indicate the switch).

According to certain aspects, the indication may be sent separately (e.g., in a separate physical channel dedicated for carrying the NBI) or embedded in an existing signal/channel (or set of signals/channels) such as an existing physical control channel or physical data channel. The indication may be provided via an (one-bit) indication in downlink control information (DCI). The NBI may be provided via a PSS/SSS/PBCH, for example, indicated by the sequence used. The NBI may also be carried in a MIB.

According to certain aspects, the NBI may be used for (e.g., may apply to) a single channel and, in this case, separate indications may be provided for different channels. For example, a first NBI can be signaled for one channel such as PBCH and a second NBI can be sent for a different signal/channel such as SIB, and so on. The indication can be provided in the same subframe as the signal/channel to which it applies. For example, the indication can be transmitted in the same subframe as PBCH to facilitate PBCH detection. Alternatively, the NBI may be used for (e.g., apply to) all channel or a set of channels.

Figure 12:
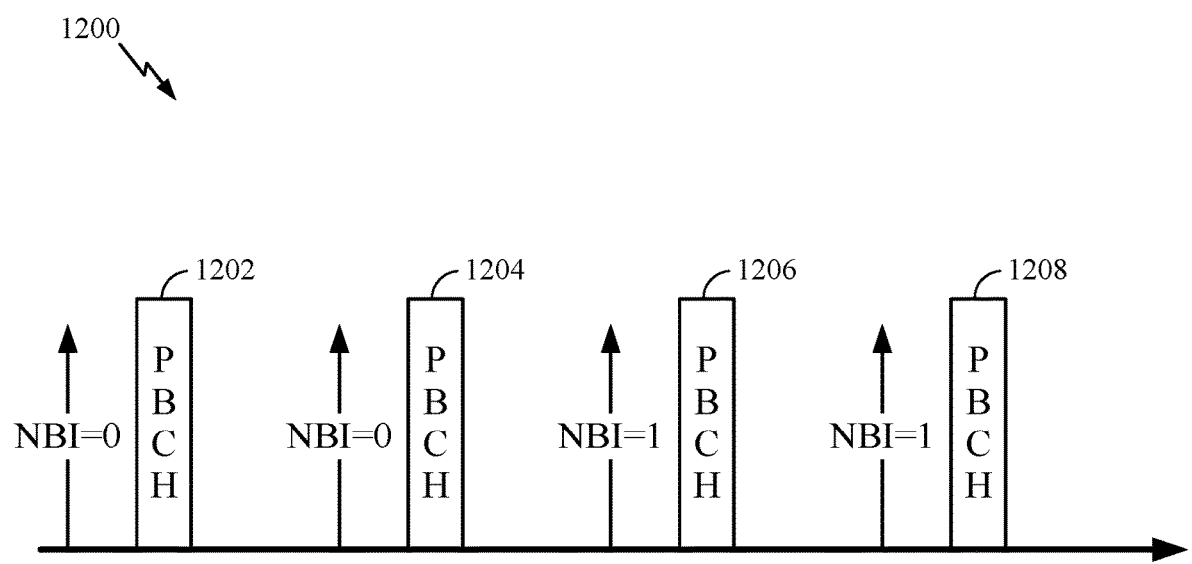
FIG. 12 illustrates example periodic new beam indicator (NBI) transmission, in accordance with certain aspects of the present disclosure.

According to certain aspects, the NBI may be transmitted regularly (e.g., periodically) or event-driven. For regular transmission, an NBI may be signaled with every transmission, regardless of whether the beam is being switched or not. In this case, the NBI may be provided via a flipped value, for example, that can indicate a new beam or a repetition (e.g., from 0 to 1 or from 1 to 0). For example, as illustrated in FIG. 12, an NBI is signaled along with each PBCH transmission 1202, 1204, 1206, 1208. The NBI for PBCH 1202 and PBCH 1204 both have the value set to 0, indicating that the same beam is used for PBCH 1202 and PBCH 1204. The NBI for PBCH 1206 has a flipped value set to 1, indicating a new beam is used for PBCH 1206, different than the beam used for PBCH 1202 and PBCH 1204. The NBI for PBCH 1208 also has the value set to 1, indicating that the beam used for PBCH 1208 is a repetition of the beam used for PBCH 1206.

Figure 13:
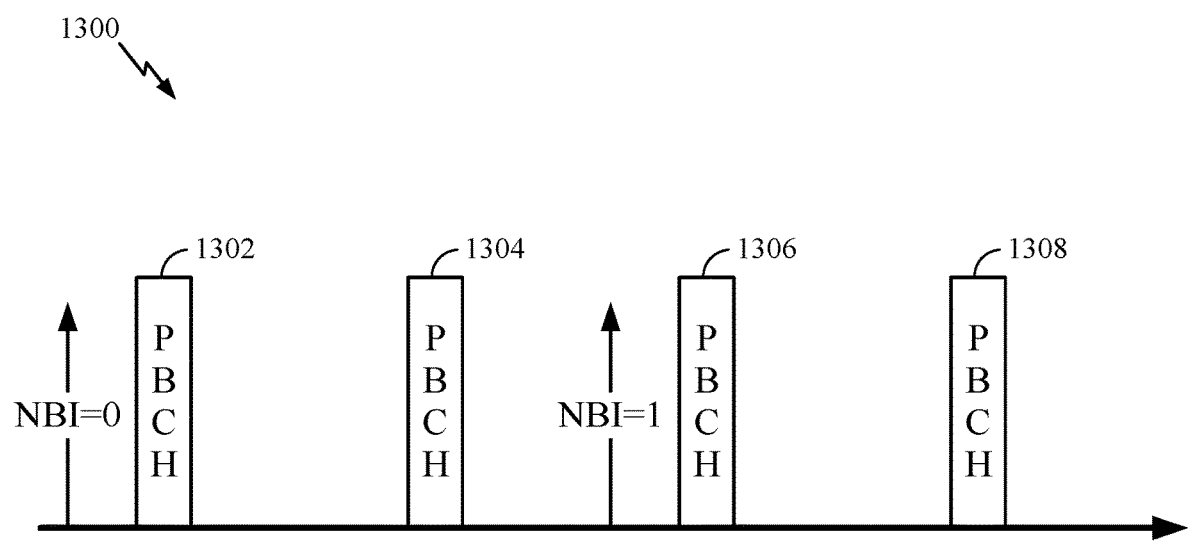
FIG. 13 illustrates example event driven NBI transmission, in accordance with certain aspects of the present disclosure.

For event-driven transmission, the NBI may be omitted if there is no beam change. In other words, the NBI may be sent only when the beam switches. In one example, an ON/OFF keying type indication may be used (e.g., if ON, a new beam; if OFF, no change in beam). As shown in FIG. 13, a NBI is sent for PBCH 1302; however, no NBI is sent for PBCH 1304, indicating that the beam used for PBCH 1302 is repeated for PBCH 1304. A NBI is sent for PBCH 1306, indicating that a new beam is used, different than the beam used for PBCH 1302 and PBCH 1304. No NBI is sent for PBCH 1308, indicating that the beam used for PBCH 1306 is repeated for PBCH 1308.

While PBCH transmissions are shown in FIG. 12 and FIG. 13, the NBI scheme may be used for different types of transmissions.

According to certain aspects, the transmitting device may be limited (e.g., restricted) to how often (e.g., a minimum duration before) it can switch beams. In some cases, the limitation may apply per-signal/channel. For example, for a particular signal/channel (e.g., PBCH), the transmitting device may be limited to updating (e.g., switching) the beam no more frequently than every x ms and for a different signal/channel the transmitting device may be limited to updating the beam no frequently than every y ms, or may not be limited at all of that signal/channel. Thus, transmission of the NBI may also be limited.

According to certain aspects, rather than sending an indication (e.g., NBI), a beam sweeping pattern may be predefined (e.g., configured) and the receiving device may be aware of the predefined pattern. Thus, the indication is not needed since the receiving device can determine the beam for a given transmission based on the pattern. In one example, a predefined pattern for beam sweeping may be that in an 8-symbol transmission of a signal/channel in a subframe, four beams may be defined (e.g., ABCD), and each pair of the symbols may have the same beam (e.g., the 8-symbol transmission may use AABBCCDD). In another example, in an eight subframe (not necessarily consecutive) transmission of a signal/channel, four beams may be defined and each pair of subframes have the same beam (e.g., the eight subframe transmission may use AABBCCDD).

Example Symbol Location Indicator

If beam sweeping is used for synchronization signals/channels, reference signals, and/or MIB, in multiple symbols in a subframe, then the UE may not be able to easily identify the location of the symbol index with the subframe since synchronization signals, such as PSS/SSS, may be the same across different symbols in the subframe.

According to certain aspects, a new signal/channel may be sent by the BS for the UE to identify (e.g., determine) the symbol location. For example, the BS may signal symbol index information for at least one subframe to a UE. The BS transmits one or more synchronization signals in the at least one subframe using beam sweeping. The symbol index information may be transmitted within a burst transmission. The symbol index information may be transmitted as a symbol specific signal, thus, by receiving the signal, the UE can identify the symbol index. The UE may receive symbol index information for at least one subframe from a BS, determine a location of one or more synchronization signals in the at least one subframe based on the symbol index information, and receive the one or more synchronization signals in the at least one subframe based on the determined locations.

The symbol index information may be signaled in a separate signal or in a channel dedicated for signaling the symbol index information. In another example, the signal or channel may be time division multiplexed (TDM) or frequency division multiplexed (FDM) in a subframe with the one or more synchronization signals. For example, the new signal/channel (e.g., which may be referred to as an enhanced synchronization signal (ESS)) may be FDM or TDM with PSS and/or SSS to carry symbol index information. Additional information may be carried on top of this new signal/channel (e.g., the ESS) to indicate beam sweeping or repetition mode. PBCH and/or reference signal detection may benefit from knowing whether a system is operating in a repetition mode after the PSS/SSS/ESS are decoded. Such a signal may additionally indicate the number of repetitions or sweeps.

Figure 14:
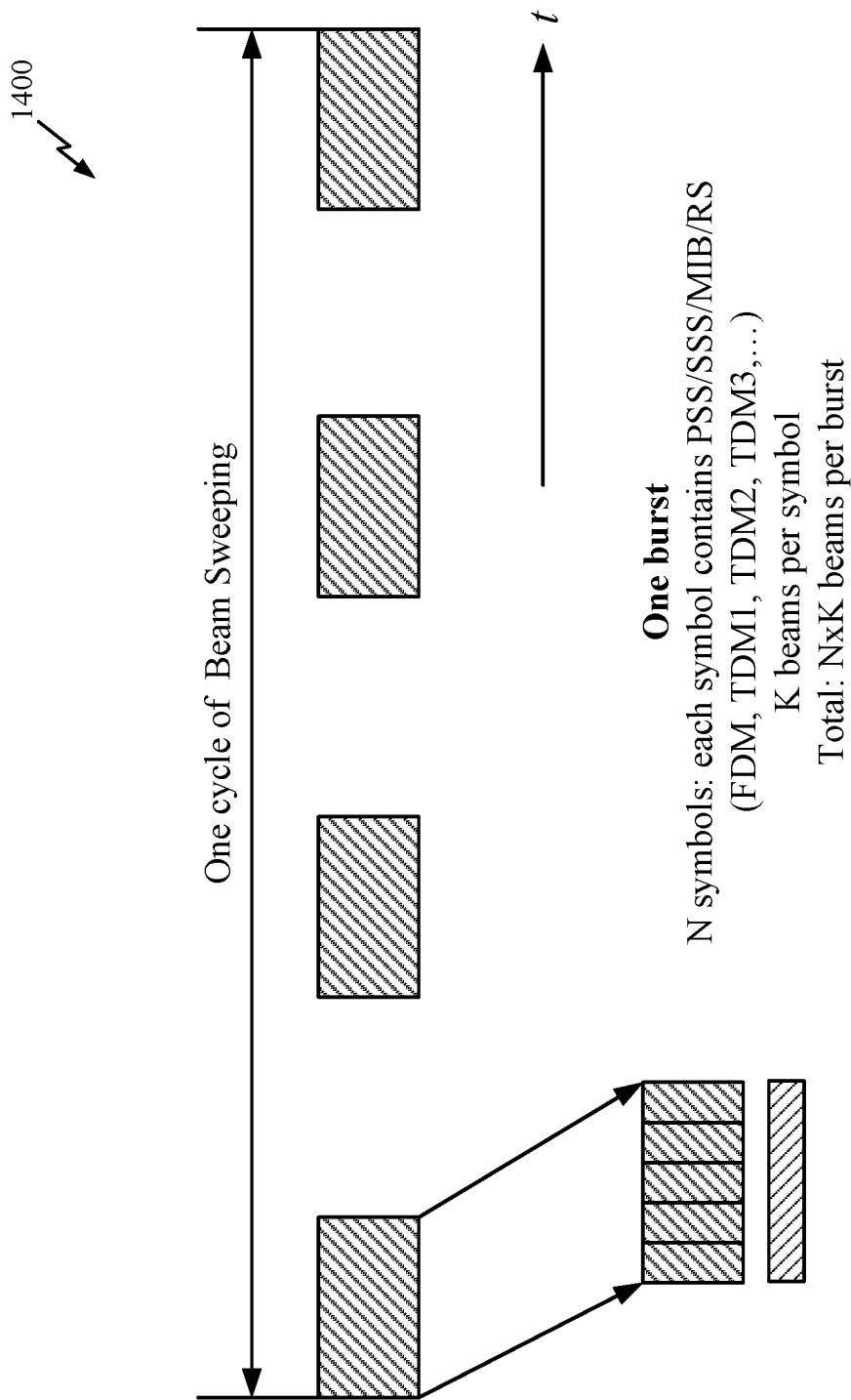
FIG. 14 illustrates example transmission of symbol index information in a subframe with one or more synchronization signals using frequency division multiplexing (FDM), in accordance with certain aspects of the present disclosure.

FIG. 14 is an example transmission timeline 1400 illustrating transmission of symbol index information in a subframe with one or more synchronization signals using FDM, in accordance with certain aspects of the present disclosure. In one N-symbol burst, each of the N symbols may contain PSS, SSS, MIB, and/or RS may be TDM or FDM in the N symbols and may be transmitted with beam sweeping. K beams could be used in each symbol for the multiplexed transmissions, thus, N×K beams are used per burst. As shown in FIG. 14, the indication can be multiplexed in the burst and may contain a symbol specific signal. The UE can use the indication to identify the symbol index in the burst.

According to certain aspects, the signal/channel may also include additional information such as the system operation mode indication described above to indicate beam sweeping mode or beam repetition mode and can also carry an indication of the number of repetitions or beam sweepings. The information may aid the UE to detect PBCH and/or RS, for example, after PSS, SSS, and/or symbol location indicator detection.

Use of the system operation indicator, new beam indicator, and/or symbol location indictor described above may be useful for the UE to detect, acquire, estimate, decode, and/or receive common channels in NR systems, where open-loop beam sweeping and/or beam repetition may be used.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving at least one indication from a base station (B S) of at least one of: a beam sweeping mode or a beam repetition mode used by the BS for one or more subsequent transmissions, wherein the at least one of: the beam sweeping mode or the beam repetition mode indicates a plurality of beams and a repetition pattern for at least one of the plurality of beams; and
   processing the one or more subsequent transmissions from the BS in accordance with the at least one indication, comprising:
      assuming beam sweeping with a different beam for each subsequent transmission over N symbols; and
      assuming repeating of the beam sweeping every M subframes, wherein N and M are based on at least one of: the type of transmission or a frequency of the transmission.

2. The method of claim 1, wherein the one or more subsequent transmissions comprise at least one of: a primary synchronization signal (PSS), a secondary synchronization signal (SSS), a physical broadcast channel (PBCH), a reference signal, a system information block (SIB), or a broadcast channel.

3. The method of claim 1, wherein:
   the beam repetition mode indicates that the one or more subsequent transmissions will be sent using a repeated beam as a previous transmission; and
   the beam sweeping mode indicates that the one or more subsequent transmissions will be sent using a different beam than the previous transmission.

4. The method of claim 1, wherein:
   the one or more subsequent transmissions comprise a synchronization signal or a broadcast channel; and
   the at least one indication indicates the beam sweeping mode.

5. The method of claim 1, further comprising:
   receiving an indication of a number of beam repetitions used for the beam repetition mode or a number of different beams used for the beam sweeping mode.

6. The method of claim 1, wherein the at least one indication is received via at least one of: an existing signal or channel, a master information block (MIB), or a separate channel dedicated for signaling the at least one indication.

7. The method of claim 6, wherein:
   the existing signal comprises a primary synchronization signal (PSS); and
   the at least one indication is signaled by a sequence used for the PSS.

8. A method for wireless communications by a user equipment (UE), comprising:
   receiving at least one indication from a base station (B S) of at least one type of beam management scheme used by the BS for one or more subsequent transmissions, wherein:
      the at least one type of beam management scheme indicates a plurality of beams and a repetition pattern for at least one of the plurality of beams;
      the at least one indication of the at least one type of beam management scheme comprises at least one indication of whether the BS is switching to a different beam for a current transmission than a beam used for a previous transmission;
      the indication of the at least one type of beam management scheme is received periodically or event-driven;
      receiving the at least one indication periodically comprises receiving the at least one indication with every transmission;
      receiving the at least one indication event-driven comprises receiving the at least one indication only when the BS is switching to a different beam; and
   processing the one or more subsequent transmissions from the BS in accordance with the at least one indication, comprising:
      assuming a different beam for each subsequent transmission; or
      assuming a repeated first beam for a first plurality of subsequent transmissions and assuming a repeated at least second beam for at least a second plurality of subsequent transmissions.

9. The method of claim 1, wherein the at least one indication applies to a set of channels.

10. The method of claim 1, wherein:
the at least one indication applies to a single channel; and
the method further comprises receiving different indications for different channels.

11. The method of claim 1, further comprising:
receiving symbol index information for at least one subframe from the BS;
determining a location of one or more synchronization signals in the at least one subframe based on the symbol index information; and
receiving the one or more synchronization signals in the at least one subframe based on the determined locations.

12. A method for wireless communications by a base station (BS), comprising:
signaling at least one indication to a user equipment (UE) of at least one of: a beam sweeping mode or a beam repetition mode used by the BS for one or more subsequent transmissions, wherein the at least one of: the beam sweeping mode or the beam repetition mode indicates a plurality of beams and a repetition pattern for at least one of the plurality of beams; and
sending the one or more subsequent transmissions to the UE in accordance with the at least one indication, comprising:
transmitting using beam sweeping with a different beam for each subsequent transmission over N symbols; and
repeating the beam sweeping every M subframes, wherein N and M are based on at least one of: the type of transmission or a frequency of the transmission.

13. The method of claim 12, further comprising:
signaling an indication of a number of beam repetitions used for a beam repetition mode or a number of different beams used for a beam sweeping mode.

14. The method of claim 12, wherein the at least one indication is signaled via at least one of: an existing signal or channel, a master information block (MIB), or a separate channel dedicated for signaling the at least one indication.

15. The method of claim 14, wherein:
the existing signal comprises a primary synchronization signal (PSS); and
the at least one indication is signaled by a sequence used for the PSS.

16. A method for wireless communications by a base stations (BS), comprising:
signaling at least one indication to a user equipment (UE) of at least one type of beam management scheme used by the BS for one or more subsequent transmissions, wherein the at least one type of beam management scheme indicates a plurality of beams and a repetition pattern for at least one of the plurality of beams, wherein:
the at least one indication of the at least one type of beam management scheme comprises an indication of whether the BS is switching to a different beam for a current transmission than a beam used for a previous transmission;
the at least one indication of the at least one type of beam management scheme is received periodically or event-driven;
signaling the at least one indication periodically comprises signaling the at least one indication with every transmission; and
signaling the at least one indication event-driven comprises signaling the at least one indication only when the BS is switching to a different beam; and
sending the one or more subsequent transmissions to the UE in accordance with the at least one indication, comprising:
using a different beam for each subsequent transmission; or
repeating a first beam for a first plurality of subsequent transmissions and repeating at least a second beam for at least a second plurality of subsequent transmissions.

17. The method of claim 12, wherein:
the at least one indication applies to a single channel; or
the at least one indication applies to a set of channels and different indications are signaled for different channels.

18. The method of claim 12, wherein the BS is limited to switching to a different beam only after a minimum duration of using a current beam.

19. The method of claim 12, further comprising:
signaling symbol index information for at least one subframe to a user equipment (UE); and
transmitting one or more synchronization signals in the at least one subframe using beam sweeping.

20. An apparatus for wireless communications, comprising:
means for receiving at least one indication from a base station (BS) of at least one of: a beam sweeping mode or a beam repetition mode used by the BS for one or more subsequent transmissions, wherein the at least one of: the beam sweeping mode or the beam repetition mode indicates a plurality of beams and a repetition pattern for at least one of the plurality of beams; and
means for processing the one or more subsequent transmissions from the BS in accordance with the at least one indication, comprising:
assuming beam sweeping with a different beam for each subsequent transmission over N symbols; and
assuming repeating of the beam sweeping every M subframes, wherein N and M are based on at least one of: the type of transmission or a frequency of the transmission.

21. The apparatus of claim 20, wherein the one or more subsequent transmissions comprise at least one of: a primary synchronization signal (PSS), a secondary synchronization signal (SSS), a physical broadcast channel (PBCH), a reference signal, a system information block (SIB), or a broadcast channel.

* * * * *